United States Patent
Cheng et al.

(10) Patent No.: US 9,491,025 B2
(45) Date of Patent: Nov. 8, 2016

(54) TIMING SYNCHRONIZATION IN AN ORTHOGONAL FREQUENCY-DIVISION MULTIPLEXING (OFDM) SYSTEM

(71) Applicant: Empire Technology Development LLC, Wilmington, DE (US)

(72) Inventors: Xiang Cheng, Beijing (CN); Rongqing Zhang, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/781,134

(22) PCT Filed: Jul. 25, 2013

(86) PCT No.: PCT/CN2013/080136
§ 371 (c)(1),
(2) Date: Sep. 29, 2015

(87) PCT Pub. No.: WO2015/010308
PCT Pub. Date: Jan. 29, 2015

(65) Prior Publication Data
US 2016/0056988 A1  Feb. 25, 2016

(51) Int. Cl.
*H04L 27/26* (2006.01)
*H04L 5/00* (2006.01)

(52) U.S. Cl.
CPC ......... *H04L 27/2675* (2013.01); *H04L 5/0007* (2013.01); *H04L 27/261* (2013.01); *H04L 27/2656* (2013.01); *H04L 27/2678* (2013.01)

(58) Field of Classification Search
CPC ........... H04L 27/2613; H04L 27/2656; H04L 27/2675; H04L 27/2626; H04L 5/0007; H04L 27/2678; H04L 27/261
See application file for complete search history.

(56) References Cited

U.S. PATENT DOCUMENTS

| 8,331,417 B2* | 12/2012 | Caffrey | H04B 1/707 375/130 |
| 2008/0002566 A1* | 1/2008 | Zhang | H04L 27/2613 370/208 |
| 2011/0110470 A1 | 5/2011 | Yu et al. | |

FOREIGN PATENT DOCUMENTS

| CN | 101883067 A | 11/2010 |
| CN | 102377726 A | 3/2012 |

OTHER PUBLICATIONS

Awoseyila, A.B., et al, "Improved Preamble-Aided Timing Estimation for OFDM systems," IEEE Communications Letters, vol. 12, Issue 11, pp. 825-827 (Nov. 2008).
Chu, D.C., "Polyphase codes with good periodic correlation properties," IEEE Transactions on Information Theory, vol. 18, Issue 7, pp. 531-532 (Jul. 1972).
Erceg, V., et al., "TGn Channel Models," IEEE P802.11 Wireless LANs Std. IEEE 802.11-03/940r3, pp. 1-46 (May 4, 2004).
(Continued)

*Primary Examiner* — Vineeta Panwalkar
(74) *Attorney, Agent, or Firm* — Brundidge & Stanger, P.C.

(57) ABSTRACT

A transmitting end of an Orthogonal Frequency-Division Multiplexing (OFDM) wireless communication system may generate a training sequence and attach the training sequence to a data sequence that contains information data. A receiving end of the OFDM wireless communication system may identify a starting position of the data sequence and further extract the data sequence.

20 Claims, 5 Drawing Sheets

(56) References Cited

OTHER PUBLICATIONS

Fan, P.Z, et al., "Class of binary sequences with zero correlation zone," Electronics Letters, vol. 35, Issue 10, pp. 777-779 (May 13, 1999).

International Search Report with Written Opinion for International Application No. PCT/CN2013/080136 mailed on May 5, 2014.

Minn, H., et al., "On Timing Offset Estimation for OFDM Systems," IEEE communications letters, vol. 4. Issue No. 7, pp. 242-244 (Jul. 2000).

Mostofi, Y., and Cox D.C., "Mathematical Analysis of the Impact of Timing Synchronization Errors on the Performance of an OFDM System," IEEE Transactions on Communications, vol. 54, Issue 2, pp. 226-230 (Feb. 2006).

Nandula, S., and Giridhar, K., and., "Robust Timing Synchronization for OFDM Based Wireless LAN System," TENCON 2003. Conference on Convergent Technologies for the Asia-Pacific Region, vol. 4, pp. 1558-1561 (Oct. 15-17, 2003).

Park, B., eta al., "A novel timing estimation method for OFDM systems," IEEE Communications Letters, vol. 7, Issue 5, pp. 239-241 (May 2003).

Schmidl, T.M., and Cox, D.C., "Robust frequency and timing synchronization for OFDM," IEEE Transactions on Communications, vol. 45, No. 12, pp. 1613-1621 (Dec. 1997).

Sheng, B., et al., "A novel timing synchronization method for OFDM systems," IEEE Communications Letters, vol. 14, Issue 12, pp. 1110-1112 (Dec. 21, 2010).

Wu, F., and Abu-Rgheff, M.A., "Time and Frequency Synchronization Techniques for OFDM Systems operating in Gaussian and Fading Channels: A Tutorial," Mobile Communications Network Research School of Computing, Communications & Electronics University of Plymouth, pp. 1-6 (Jun. 2007).

Yi, G., et al., "An efficient symbol timing synchronization for OFDM systems," Journal of Xidian University, vol. 34, pp. 9-13 (Sep. 2007).

Zhou, L., and Saito, M., "A new symbol timing synchronization for OFDM based WLANs under multipath fading channels," 15th IEEE International Symposium on Personal, Indoor and Mobile Radio Communications, vol. 2, pp. 1210-1214 (Sep. 5-8, 2004).

* cited by examiner

TIMING SYNCHRONIZATION IN AN ORTHOGONAL FREQUENCY-DIVISION MULTIPLEXING (OFDM) SYSTEM

CROSS-REFERENCE TO RELATED APPLICATIONS

This application is the National Stage filing under 35 U.S.C. §371 of PCT Application Ser. No. PCT/CN2013/080136, filed Jul. 25, 2013. The disclosure of the PCT Application is hereby incorporated herein by reference in its entirety.

TECHNICAL FIELD

The technologies described herein pertain generally to timing synchronization in an Orthogonal Frequency-Division Multiplexing (OFDM) wireless communication system.

BACKGROUND

Unless otherwise indicated herein, the approaches described in this section are not prior art to the claims in this application and are not admitted to be prior art by inclusion in this section.

Orthogonal Frequency-Division Multiplexing (OFDM) has been widely used in wireless communication systems due to its data transmission capabilities and tolerance to interference caused by multipath effect. In a wireless communication system that adopts the OFDM method in the transmission of wireless signals, failing to synchronize timing, i.e., the clock accuracy of sampling, at the transmitting end and the receiving end may cause substantial interference and, further, lower the quality of communication.

SUMMARY

Technologies are generally described for timing synchronization in an OFDM system. The various techniques described herein may be implemented in various devices, methods and/or systems.

In some examples, various embodiments may be implemented as systems. Some systems may include a transmitter configured to generate a first sequence; generate a second sequence by inverting the first sequence; generate a third sequence by complementing the first sequence; generate a fourth sequence by complementing the second sequence; compose a training sequence to indicate a starting position of a data sequence by combining the first sequence, the second sequence, the third sequence, and the fourth sequence successively; and attach the training sequence to the data sequence that includes information data; and the system further comprises an antenna configured to transmit the training sequence and the data sequence.

In some examples, various embodiments may be implemented as devices. Some devices may include a sequence generator configured to generate a first sequence; an inverter configured to generate a second sequence by inverting the first sequence; a first complement module configured to generate a third sequence by complementing the first sequence; a second complement module configured to generate a fourth sequence by complementing the second sequence; and a register configured to generate a training sequence by combining the first sequence, the second sequence, the third sequence, and the fourth sequence successively.

In yet other examples, various embodiments may be implemented as computer-readable mediums having executable instructions stored thereon. Some computer-readable mediums may store instructions that, when executed, cause one or more processors to perform operations comprising composing a training sequence by generating a first sequence; generating a second sequence by inverting the first sequence; generating a third sequence by complementing the first sequence; generating a fourth sequence by complementing the second sequence; and combining the first sequence, the second sequence, the third sequence, and the fourth sequence successively; attaching the training sequence to a data sequence; attaching a cyclic prefix to the training sequence and to the data sequence; and transmitting the training sequence and the data sequence.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
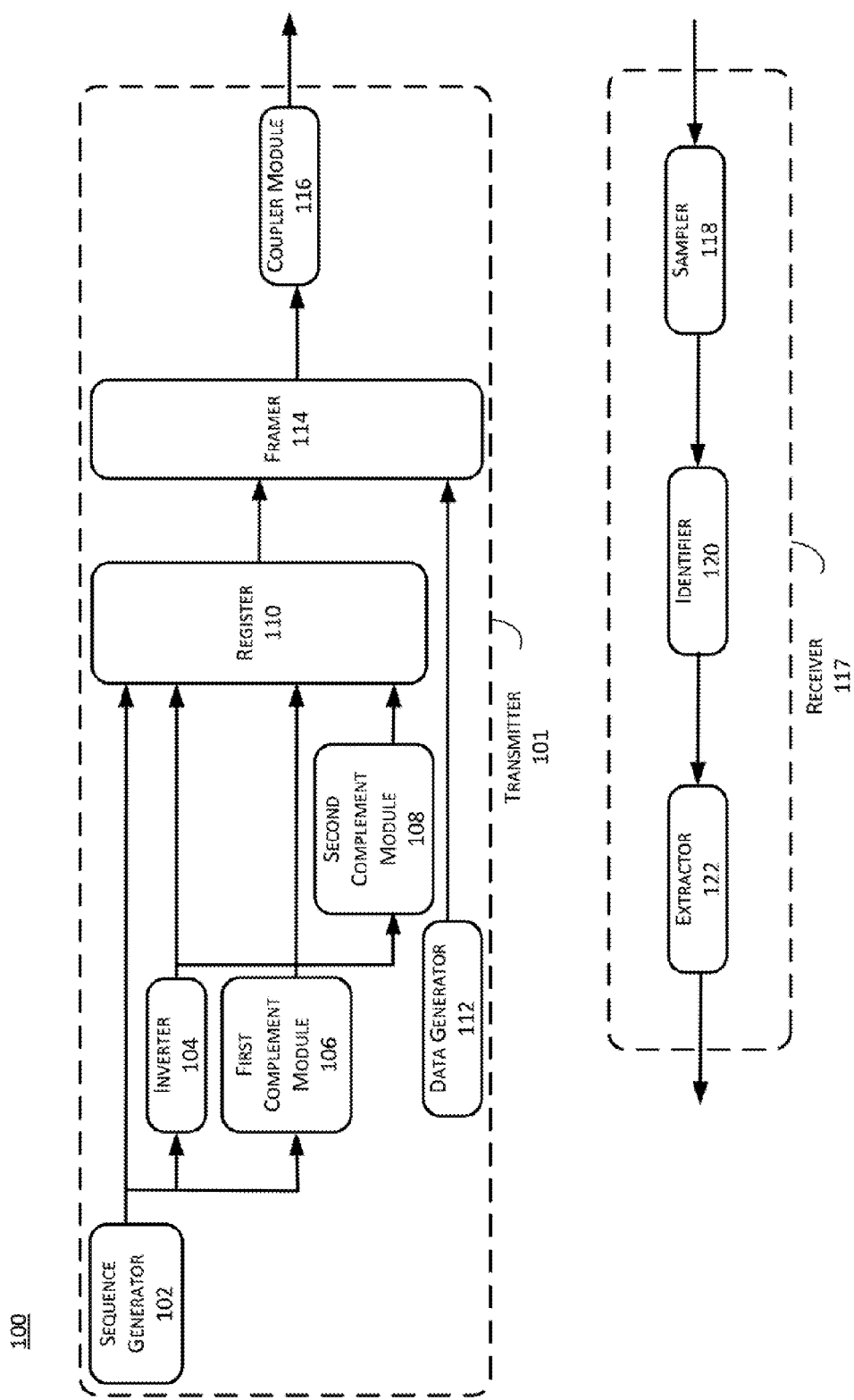
FIG. 1 shows an example system in which timing synchronization in an OFDM system may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

To eliminate intersymbol interference in a wireless communication system, a transmitter of an OFDM wireless communication system may generate a training sequence that may be attached to a data sequence that includes data. Further, the transmitter may be configured to transmit multiple wireless signals that carry the training sequence and the data sequence. A receiver of the OFDM wireless communication system may identify a starting position of the data sequence and further extract the data sequence from the received wireless signals.

FIG. 1 shows an example system 100 in which timing synchronization in an OFDM system may be implemented. As depicted, example system 100 may, at least, include a transmitter 101 that includes, at least, a sequence generator 102, an inverter 104, a first complement module 106, a second complement module 108, a register 110, a data generator 112, a framer 114, and a coupler module 116; and a receiver 117 that includes, at least, a sampler 118, an identifier 120, and an extractor 122.

Transmitter 101 may refer to a physical device that may be configured to transmit one or more wireless signals that may carry information in accordance with one or more wireless communication protocols, e.g., Time Division Duplex Long Term Evolution (TDD-LTE), Frequency Division Duplexing Long Term Evolution (FDD-LTE), IEEE 802.15.4, etc.

Sequence generator 102 may refer to a software component, a hardware component, a firmware component, or a combination thereof, that may be configured to generate a first sequence of the training sequence, which includes multiple symbols as a first part of the training sequence. The training sequence may refer to a signal sequence that may help the receiver detect a starting position of the data sequence. The first sequence may further be the basis of forming the rest of the training sequence. In accordance with some examples, the first sequence may be a pseudo-noise sequence. As referenced herein, a pseudo-noise sequence may refer to a sequence similar to noise that satisfies one or more tests for statistical randomness, e.g., as published by M. G. Kendall and Bernard Babington Smith in the Journal of Royal Statistical Society in 1938. Such tests may include a frequency test, a serial test, a poker test, a gap test, etc. In some examples, the first sequence may be referred as A=[a, b, c, d]. In accordance with some other examples, the first sequence may be a Zadoff-Chu sequence or a zero correlation zone (ZCZ) sequence.

Inverter 104 may refer to a software component, a hardware component, a firmware component, or a combination thereof, that may be configured to generate a second sequence, e.g., as a second part of the training sequence, by inverting the first sequence. That is, inverter 104 may be configured to reverse the symbols of the first sequence to generate the second sequence. For example, when the first sequence is referred as [a, b, c, d], the symbols may be reversed in order and thus the second sequence may be referred to as [d, c, b, a].

First complement module 106 may refer to a software component, a hardware component, a firmware component, or a combination thereof, that may be configured to generate a third sequence, e.g., as a third part of the training sequence by complementing the first sequence. That is, first complement module 106 may be configured to perform a logical negation on each symbol of the first sequence. The third sequence may then be referred to as [−a, −b, −c, −d].

Second complement module 108 may refer to a software component, a hardware component, a firmware component, or a combination thereof, that may be configured to generate a fourth sequence, e.g., as a fourth part of the training sequence by complementing the second sequence. That is, second complement module 108 may be configured to perform a logical negation on each symbol of the second sequence. The fourth sequence may be referred to as [−d, −c, −b, −a].

Register 110 may refer to a software component, a hardware component, a firmware component, or a combination thereof, that may be configured to store and combine the first sequence, the second sequence, the third sequence, and the fourth sequence combined in the indicated order to generate the training sequence. Further, register 110 may be configured to output the training sequence to framer 114.

Data generator 112 may refer to a software component, a hardware component, a firmware component, or a combination thereof, that may be configured to generate a data sequence that carries data. In accordance with some examples, the length of the data sequence may equal the combined length of the first sequence, the second sequence, the third sequence, and the fourth sequence. Data generator 112 may further output the data sequence to framer 114.

Framer 114 may refer to a software component, a hardware component, a firmware component, or a combination thereof, that may be configured to combine the training sequence and the data sequence. In some examples, framer 114 may be configured to place the training sequence before the data sequence.

Coupler module 116 may refer to a software component, a hardware component, a firmware component, or a combination thereof, that may be configured to attach a cyclic prefix to the beginning and the end of the training sequence to generate an output sequence carried by one or more wireless signals. In accordance with some examples, transmitter 101 may include an antenna to transmit one or more wireless signals that carry the output sequence to receiver 117.

Receiver 117 may refer to a physical device that may be configured to receive the one or more wireless signals that may carry information in accordance with the aforementioned one or more wireless communication protocols. In some examples, receiver 117 may be configured to receive the output sequence that includes the training sequence and the data sequence.

Sampler 118 may refer to a software component, a hardware component, a firmware component, or a combination thereof, that may be configured to determine multiple sampling positions of the received output sequence and, further, determine a respectively corresponding one of multiple values of a timing function. That is, sampler 118 may be configured to calculate multiple values of the timing function corresponding to the multiple sampling positions and, further, determine one of the multiple sampling positions that corresponds to a maximum value of the timing function among the calculated multiple values. In accordance with some examples, the timing function is $$M(d) = \frac{|P(d)|^2}{(R(d))^2}$$

when $P(d) = \sum_{k=0}^{N/2-1} r(d+k)r^*(d-1-k) +$ $\sum_{k=0}^{N/4-1} r(d+k)r^*\left(d - \frac{N}{2} + k\right) + \sum_{k=0}^{N/4-1} r\left(d - \frac{N}{4} + k\right)r^*\left(d + \frac{N}{4} + k\right)$ and $$R(d) = 2 \sum_{k=0}^{N/2-1} |r(d+k)|^2,$$

wherein d may refer to one of the multiple sampling positions; r( ) represents the one of multiple values of the timing function; and r*( ) represents the conjugate value of the one of multiple values of the timing function.

Identifier 120 may refer to a software component, a hardware component, a firmware component, or a combination thereof, that may be configured to identify the starting position of the received data sequence. That is, identifier 120 may be configured to offset the one of the multiple sampling positions that corresponds to the maximum value of the timing function by a predetermined length, e.g., half of the length of the data sequence, and to identify the offset one of the multiple sampling position as the starting position of the data sequence. For example, when the one of the multiple sampling positions that corresponds to the maximum value of the timing function is referred as $d_1$, the starting position of data sequence may be identified as $$d_0 = d_1 - \frac{N}{2},$$

when N is the length of the data sequence.

Extractor 122 may refer to a software component, a hardware component, a firmware component, or a combination thereof, that may be configured to extract the data sequence from the output sequence from the identified starting position. Further, extractor 122 may be configured to transmit the extracted data sequence to one or more computing devices for further process.

Thus, FIG. 1 shows an example system 100 that may include sequence generator 102, inverter 104, first complement module 106, second complement module 108, register 110, data generator 112, framer 114, coupler module 116, sampler 118, identifier 120, and extractor 122.

Figure 2:
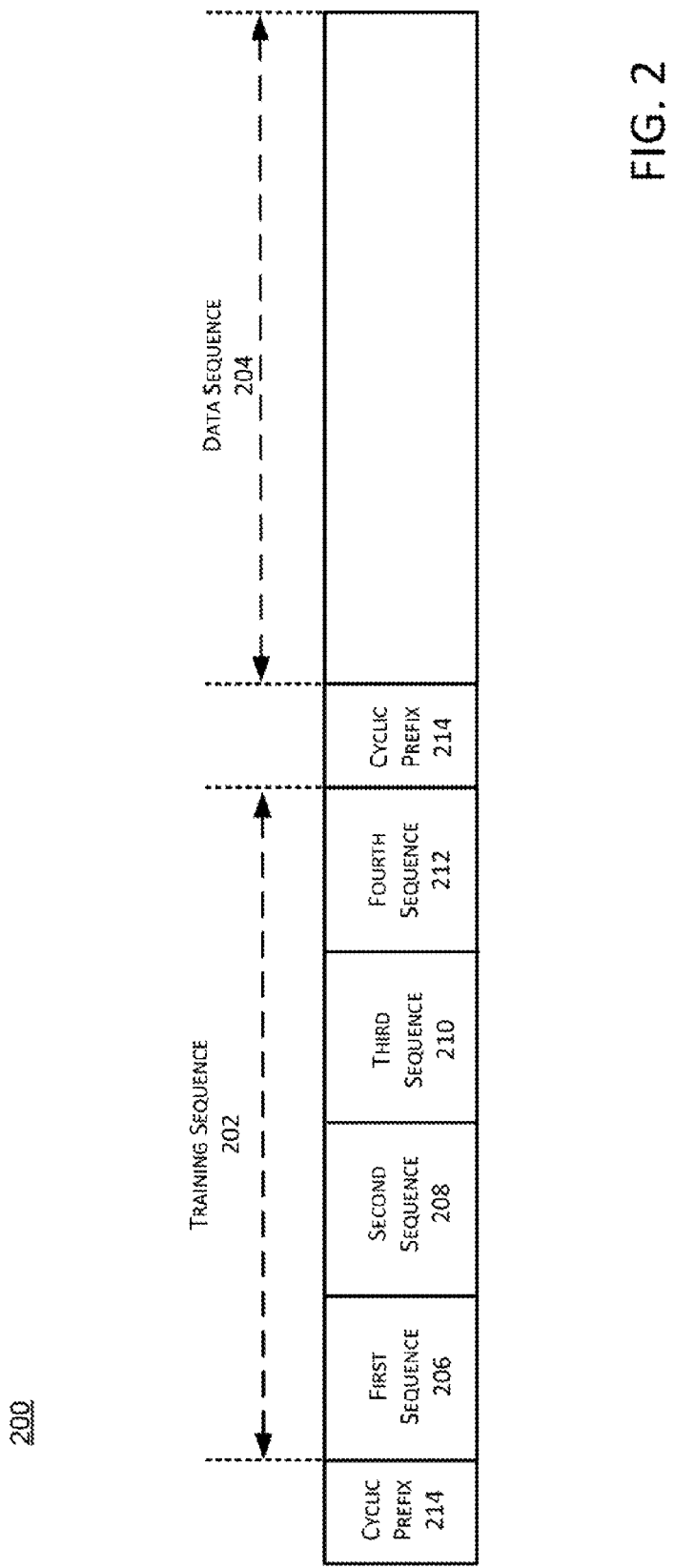
FIG. 2 shows an example output sequence by which timing synchronization in an OFDM system may be implemented.

FIG. 2 shows an example output sequence 200 by which timing synchronization in an OFDM system may be implemented. As depicted, example output sequence 200 may, at least, include a training sequence 202, a data sequence 204, a first sequence 206, a second sequence 208, a third sequence 210, a fourth sequence 212, and two cyclic prefixes 214.

Training sequence 202 may refer to an output sequence generated by register 110 by combining first sequence 206, second sequence 208, third sequence 210, and fourth sequence 212. The length of training sequence 202 may equal the length of data sequence 204. Training sequence may refer to a signal sequence known to both transmitter 101 and receiver 117, which may be configured to help, i.e., train, the receiver 117 detect a starting position of data sequence 204.

Data sequence 204 may refer to a sequence generated by data generator 112 that may carry data for wireless communication. The data may include voice data, web browsing data, or other forms of data that may be transmitted wirelessly from transmitter 101 to receiver 117.

First sequence 206 may refer to a sequence generated by sequence generator 102 that may be the first part of training sequence 202. In accordance with some examples, the length of first sequence 206 may be predetermined as one fourth of the length of training sequence 202. In at least some examples, first sequence 206 may be in the form of a pseudo noise sequence, a Zadoff-Chu sequence, or a ZCZ sequence. First sequence 206 may be output to register 110, inverter 104, and first complement module 106.

Second sequence 208 may refer to a sequence generated by inverter 104 by inverting first sequence 206 received from sequence generator 102. As referenced herein, inverting may refer to reversing the order of the symbols of a given sequence. For example, when first sequence 206 is referred to as [a, b, c, d], the inverted sequence, e.g., second sequence 208, may be referred to as [d, c, b, a]. Second sequence 208 may be output to register 110 and second complement module 108.

Third sequence 210 may refer to a sequence generated by first complement module 106 by complementing first sequence 206 received from sequence generator 102. As referenced herein, complementing may refer to complement modules, e.g., first complement module 106 and second complement module 108, performing a logical negation on each symbol of a given sequence. As a result, when first sequence is referred to as [a, b, c, d], the complemented sequence, i.e., third sequence 210, may be referred to as [−a, −b, −c, −d]. Third sequence 210 may be output by first complement module 106 to register 110.

Fourth sequence 212 may refer to a sequence generated by second complement module 108 by complementing second sequence 208 received from inverter 104. Thus, fourth sequence 212 may be referred to as [−d, −c, −b, −a].

Cyclic prefix 214 may refer to a predetermined group of one or more symbols that may be attached to the beginning and the end of training sequence 202 or to the beginning of training sequence 202 and data sequence 204. By separating training sequence 202 and data sequence 204, cyclic prefix 214 may eliminate at least portions of intersymbol interference in the wireless communication.

Thus, FIG. 2 shows an example output sequence 200 that may include training sequence 202, which further includes first sequence 206, second sequence 208, third sequence 210, and fourth sequence 212, and data sequence 204.

Figure 3:
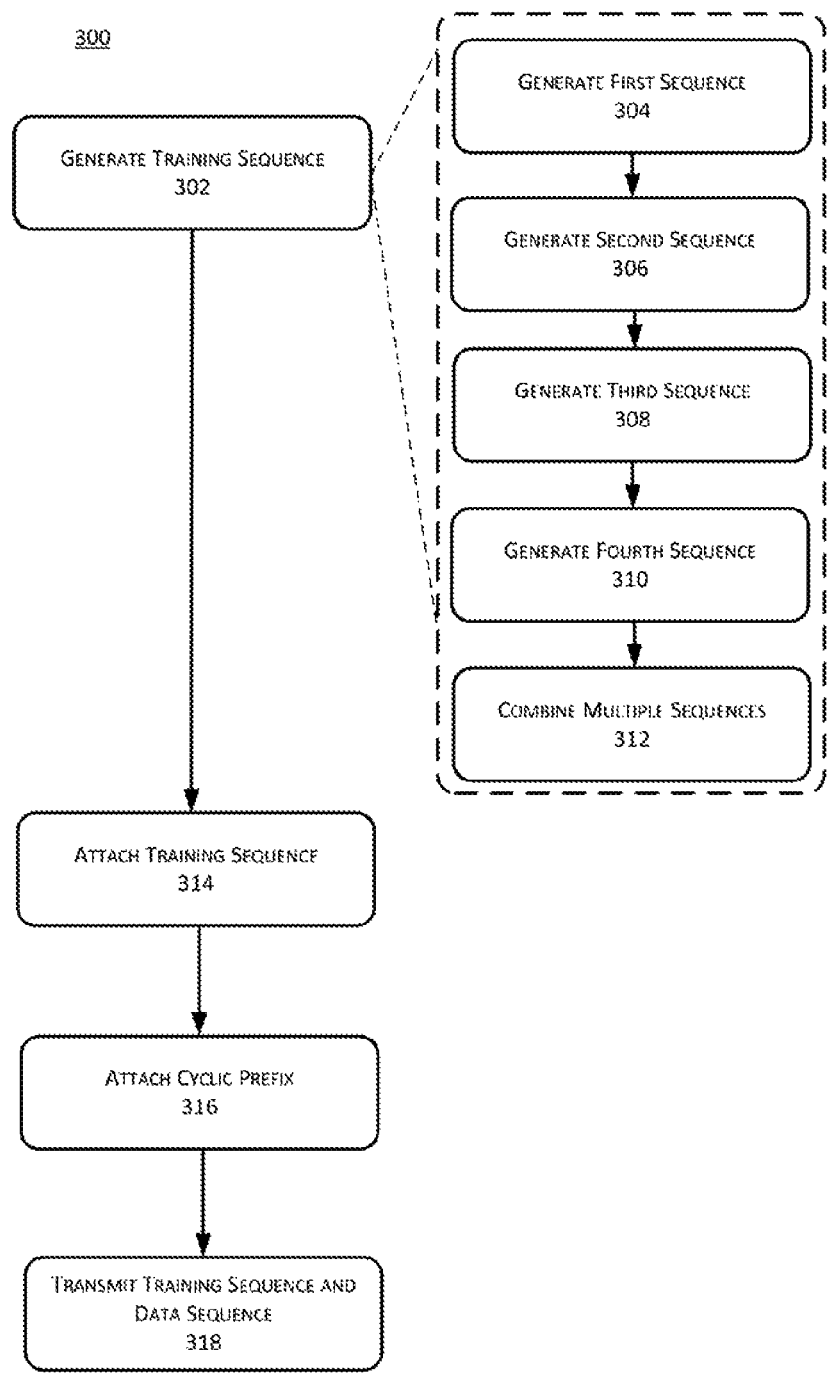
FIG. 3 shows an example configuration of a processing flow of operations by which timing synchronization in an OFDM system may be implemented.

FIG. 3 shows an example configuration of a processing flow of operations by which timing synchronization in an OFDM system may be implemented. As depicted, processing flow 300 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, 306, 308, 310, 312, 314, 316, and/or 318. Processing may begin at block 302.

Block 302 (Generate Training Sequence) may refer to register 110 generating training sequence 202. Block 302 may include blocks 304, 306, 308, 310, and 312, which indicate the sub-processes of block 302.

Block 304 (Generate First Sequence) may refer to sequence generator 102 generating first sequence 206 that includes multiple symbols as the first part of training sequence 202. Other parts of training sequence 202, e.g., second sequence 208, third sequence 210, and fourth sequence 212, may be formed based on first sequence 206. Processing may continue from block 304 to block 306.

Block 306 (Generate Second Sequence) may refer to inverter 104 generating second sequence 208 as the second part of training sequence 202 by inverting, i.e., reversing, the order of the multiple symbols of a given sequence, first sequence 206. Processing may continue from block 306 to block 308.

Block 308 (Generate Third Sequence) may refer to first complement module 106 generating third sequence 210 as the third part of training sequence 202 by complementing, i.e., performing a logical negation on each symbol of a given sequence, first sequence 206. Processing may continue from block 308 to block 310.

Block 310 (Generate Fourth Sequence) may refer to second complement module 108 generating fourth sequence 212 as the last part of training sequence 202 by complementing second sequence 208. Processing may continue from block 310 to block 312.

Block 312 (Combine Multiple Sequences) may refer to register 110 storing and combining the multiple sequences that include first sequence 206, second sequence 208, third sequence 210, and fourth sequence 212, to generate training sequence 202. Block 312 may complete the sub-operations of block 302, and therefore processing may continue from block 302 to block 314.

Block 314 (Attach Training Sequence) may refer to framer 114 attaching training sequence 202 to data sequence 204. In some examples, framer 114 may be configured to attach training sequence 202 to the beginning of data sequence 204 as shown in FIG. 2. Processing may continue from block 314 to block 316.

Block 316 (Attach Cyclic Prefix) may refer to coupler module 116 attaching cyclic prefix 214 to the beginning and the end of training sequence 202 or to the beginning of training sequence 202 and data sequence 204.

Thus, process 300 shows an example configuration of a processing flow of operations to construct training sequence 202 and, further, to attach training sequence 202 to data sequence 204.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
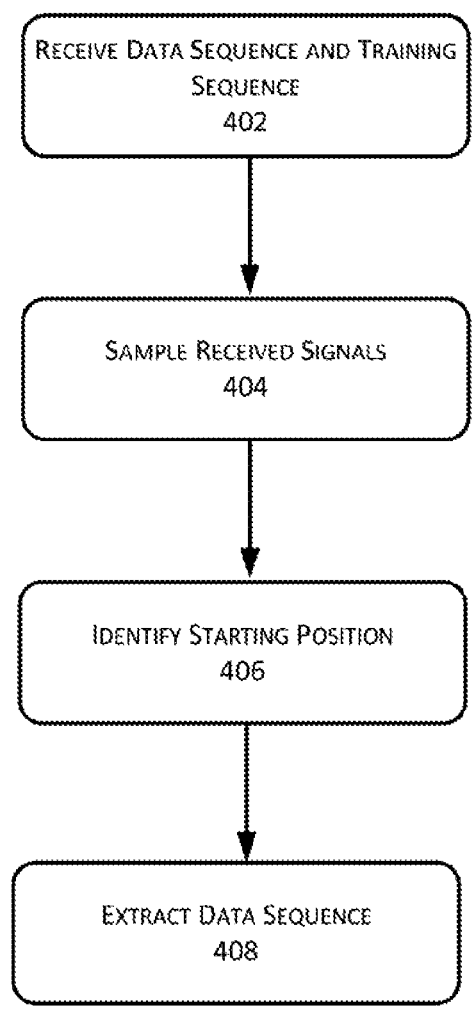
FIG. 4 shows an example configuration of a processing flow of operations by which timing synchronization in an OFDM system may be implemented.

FIG. 4 shows an example configuration of a processing flow of operations by which timing synchronization in an OFDM system may be implemented. As depicted, processing flow 400 may include sub-processes executed by various components that are part of example system 100. However, processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, and/or 408. Processing may begin at block 402.

Block 402 (Receive Data Sequence and Training Sequence) may refer to receiver 117 receiving one or more wireless signals, from transmitter 101, which carry the output sequence that includes training sequence 202 and data sequence 204. Processing may continue from block 402 to block 404.

Block 404 (Sample Received Signals) may refer to sampler 118 determining multiple sampling positions and a respectively corresponding one of multiple values of a timing function. That is, sampler 118 may be configured to calculate multiple values of the timing function corresponding to the multiple sampling positions and, further, determine one of the multiple sampling positions that corresponds to a maximum value of the timing function. In accordance with some examples, the timing function is $$M(d) = \frac{|P(d)|^2}{(R(d))^2}$$

when $P(d) = \sum_{k=0}^{N/2-1} r(d+k)r^*(d-1-k) +$ $\sum_{k=0}^{N/4-1} r(d+k)r^*\left(d - \frac{N}{2} + k\right) + \sum_{k=0}^{N/4-1} r\left(d - \frac{N}{4} + k\right)r^*\left(d + \frac{N}{4} + k\right)$ and $$R(d) = 2\sum_{k=0}^{N/2-1} |r(d+k)|^2,$$

wherein d may refer to one of the multiple sampling positions; r( ) may represent the one of multiple values of the timing function; and r*( ) may represent the conjugate value of the one of multiple values of the timing function. That is, the one of the multiple sampling positions that corresponds to a maximum value of the timing function may be the basis for locating a starting position for extracting data sequence 204 and, further, may reduce the intersymbol interferences in a wireless communication system that adopts OFDM method. Processing may continue from block 404 to block 406.

Block 406 (Identify Starting Position) may refer to identifier 120 offsetting one of the multiple sampling positions that corresponds to a maximum value of the timing function by a predetermined length, e.g., half of the length of the data sequence, and identify the offset one of the multiple sampling positions as the starting position of the data sequence. Processing may continue from block 406 to block 408.

Block 408 (Extract Data Sequence) may refer to extractor 122 extracting data sequence 204 from the one or more wireless signals that carry the output sequence and, further, transmit the extracted data sequence to one or more computing devices. Extracting data sequence from the offset one of the multiple sampling positions corresponding to the maximum value of the timing function may result in minimizing intersymbol interferences in a wireless communication system.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Figure 5:
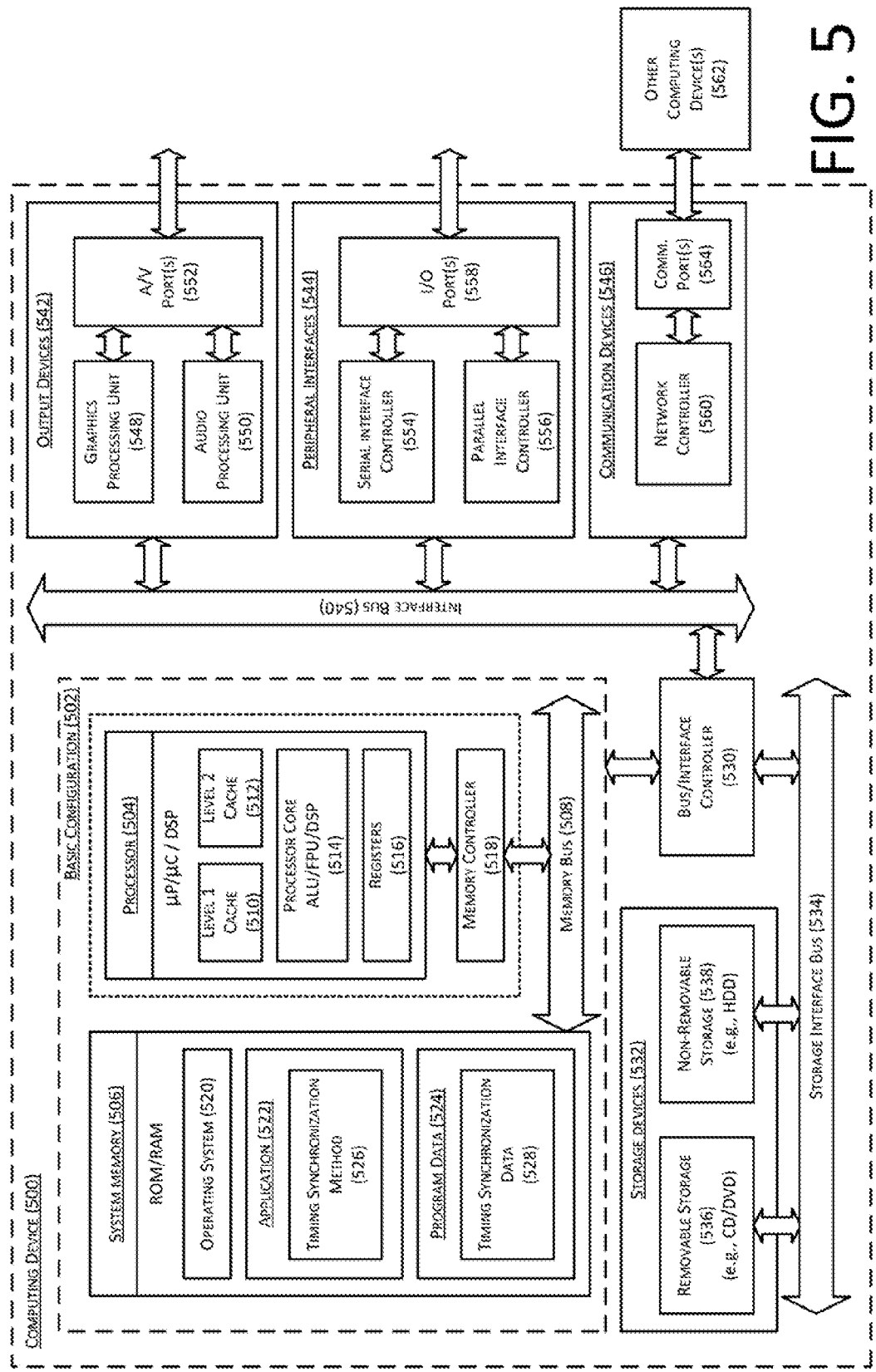
FIG. 5 shows a block diagram illustrating an example computing device that is arranged for timing synchronization in an OFDM system, all arranged in accordance with at least some embodiments described herein.

FIG. 5 shows a block diagram illustrating an example computing device that is arranged for timing synchronization in an OFDM system.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a timing synchronization method 526 that is arranged to perform the functions as described herein including those described with respect to process 300 of FIG. 3 and process 400 of FIG. 4. Program data 524 may include timing synchronization data 528 that may be useful for operation with timing synchronization method 526 as is described herein. In some embodiments, application 522 may be arranged to operate with program data 524 on operating system 520 such that implementations of timing synchronization in an OFDM system may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system to produce a training sequence for synchronizing timing in a wireless communication, comprising:
   a transmitter configured to:
      generate a first sequence,
      generate a second sequence by inverting the first sequence,
      generate a third sequence by complementing the first sequence,
      generate a fourth sequence by complementing the second sequence,
      compose the training sequence to indicate a starting position of a data sequence for synchronizing timing in wireless communication of the data sequence by combining the first sequence, the second sequence, the third sequence, and the fourth sequence successively, and
      attach the training sequence to the data sequence that includes information data; and
   an antenna configured to:
      wirelessly transmit an output sequence that includes the training sequence and the data sequence.

2. The system of claim 1, further comprising:
   a receiver configured to:
      receive one or more wireless signals that include the training sequence and the data sequence;
      identify a starting position of the data sequence in the one or more wireless signals;
      extract the data sequence from the one or more wireless signals;
      further transmit the extracted data sequence to one or more computing devices.

3. The system of claim 1, wherein the length of the first sequence is less than the length of the data sequence.

4. The system of claim 1, wherein the transmitter is further configured to attach the training sequence to the beginning of the data sequence.

5. The system of claim 1, wherein the transmitter is further configured to:
   attach a cyclic prefix to the training sequence and to the data sequence before transmitting the training sequence and the data sequence.

6. The system of claim 2, wherein the receiver is further configured to:
   determine multiple sampling positions and a respectively corresponding one of multiple values of a timing function; and
   offset, by a predetermined length, one of the multiple sampling positions that corresponds to the maximum of the multiple values.

7. The system of claim 6, wherein the timing function is $$M(d) = \frac{|P(d)|^2}{(R(d))^2},$$

wherein $P(d) = \sum_{k=0}^{N/2-1} r(d+k)r^*(d-1-k) +$ $\sum_{k=0}^{N/4-1} r(d+k)r^*\left(d - \frac{N}{2} + k\right) + \sum_{k=0}^{N/4-1} r\left(d - \frac{N}{4} + k\right)r^*\left(d + \frac{N}{4} + k\right)$ and $$R(d) = 2\sum_{k=0}^{N/2-1} |r(d+k)|^2,$$

and wherein
   d represents one of the multiple sampling positions,
   r( ) represents the one of multiple values of the timing function, and
   r*( ) represents the conjugate value of the one of multiple values of the timing function.

8. A device, comprising:
   a sequence generator configured to generate a first sequence;
   an inverter configured to generate a second sequence by inverting the first sequence;
   a first sequence convertor configured to input the first sequence, complement the first sequence, and output the complemented first sequence as a third sequence;
   a second sequence convertor configured to input the second sequence, complement the second sequence, and output the complemented second sequence as a fourth sequence;
   a register configured to:
      generate a training sequence for synchronizing timing in wireless communication of data by combining the first sequence, the second sequence, the third sequence, and the fourth sequence successively; and output an output sequence that includes the training sequence and the data sequence; and an antenna configured to wirelessly transmit the output sequence that includes the training sequence and the data sequence.

9. The device of claim 8, further comprising:

a data generator configured to generate a data sequence;

a framer configured to combine the training sequence and the data sequence; and a coupler module configured to attach a cyclic prefix to the training sequence and to the data sequence.

10. The device of claim 8, wherein the first sequence is a pseudo noise sequence.

11. The device of claim 9, wherein the length of the first sequence is less than the length of the data sequence.

12. The device of claim 9, wherein the data generator is configured to generate the data sequence in accordance with orthogonal frequency-division multiplexing (OFDM).

13. A non-transitory computer-readable medium storing instructions that, when executed, cause one or more processors to perform operations comprising:

composing a training sequence by:
generating a first sequence,
generating a second sequence by inverting the first sequence,
generating a third sequence by complementing the first sequence,
generating a fourth sequence by complementing the second sequence, and
combining the first sequence, the second sequence, the third sequence, and the fourth sequence successively;

attaching the training sequence to a data sequence;

attaching a cyclic prefix to the training sequence and to the data sequence; and wirelessly transmitting an output sequence that includes the training sequence and the data sequence.

14. The non-transitory computer-readable medium of claim 13, wherein the length of the first sequence is less than the length of the data sequence.

15. The non-transitory computer-readable medium of claim 13, wherein the attaching comprises attaching the training sequence to the beginning of the data sequence.

16. The non-transitory computer-readable medium of claim 13, wherein the first sequence is a pseudo noise sequence.

17. A non-transitory computer-readable medium storing instructions that, when executed, cause one or more processors to perform operations comprising:

receiving a wireless signal including a data sequence and a training sequence for synchronizing timing in wireless communication of the data sequence;

determining multiple sampling positions of the wireless signal and a respectively corresponding one of multiple values of a timing function;

offsetting, by a predetermined length, one of the multiple sampling positions that corresponds to the maximum of the multiple values; and identifying the offset one of the multiple sampling positions as a synchronized starting position of the data sequence.

18. The non-transitory computer-readable medium of claim 17, wherein the timing function is $$M(d) = \frac{|P(d)|^2}{(R(d))^2},$$

wherein $P(d) = \sum_{k=0}^{N/2-1} r(d+k)r^*(d-1-k) +$ $\sum_{k=0}^{N/4-1} r(d+k)r^*\left(d - \frac{N}{2} + k\right) + \sum_{k=0}^{N/4-1} r\left(d - \frac{N}{4} + k\right)r^*\left(d + \frac{N}{4} + k\right)$ and $$R(d) = 2\sum_{k=0}^{N/2-1} |r(d+k)|^2,$$

and wherein d represents one of the multiple sampling positions, r( ) represents the one of multiple values of the timing function, and r*( ) represents the conjugate value of the one of multiple values of the timing function.

19. The non-transitory computer-readable medium of claim 17, wherein the training sequence includes:

a first sequence;

a second sequence generated by inverting the first sequence;

a third sequence generated by complementing the first sequence; and a fourth sequence generated by complementing the second sequence.

20. The non-transitory computer-readable medium of claim 17, further comprising detaching a cyclic prefix from the training sequence and the data sequence.

* * * * *

UNITED STATES PATENT AND TRADEMARK OFFICE
CERTIFICATE OF CORRECTION

PATENT NO. : 9,491,025 B2
APPLICATION NO. : 14/781134
DATED : November 8, 2016
INVENTOR(S) : Cheng et al.

Page 1 of 1

It is certified that error appears in the above-identified patent and that said Letters Patent is hereby corrected as shown below:

In the Specification

In Column 1, Line 6, delete "APPLICATIONS" and insert -- APPLICATION --, therefor.

In Column 1, Line 9, delete "§371" and insert -- § 371 --, therefor.

In Column 12, Line 43, delete "at least one and one or more" and insert -- "at least one" and "one or more" --, therefor.

In Column 12, Line 46, delete "an" and insert -- "an" --, therefor.

In Column 12, Lines 49-50, delete "one or more or at least one" and insert -- "one or more" or "at least one" --, therefor.

In Column 12, Line 51, delete "an" and insert -- "an" --, therefor.

Signed and Sealed this
Fourteenth Day of March, 2017

Michelle K. Lee
*Director of the United States Patent and Trademark Office*